United States Patent Office 3,649,576
Patented Mar. 14, 1972

3,649,576
COBALT II HALIDE COMPLEXES OF
UNIDENTATE LIGANDS
Christian H. Stapfer, Newtown, Pa., assignor to Carlisle
Chemical Works, Inc., Reading, Ohio
No Drawing. Filed Apr. 6, 1970, Ser. No. 26,159
Int. Cl. C08f *21/04;* C08g *17/16;* C05d *3/68*
U.S. Cl. 260—22 CA                                  10 Claims

ABSTRACT OF THE DISCLOSURE

Cobalt II halide complexes of the formula

[Co(II)(Z)$_n$]X$_2$ where X is a halogen, Z is a non sulfur bearing, non nitro, unidentate ligand and $n$ is 1 to 6 are used as driers for alkyd resins and to accelerate the oxidative polymerization of unsaturated polyesters, in conjunction with organic peroxides.

---

This invention relates to the use of anhydrous solutions of cobalt II halides in various non sulfur containing solvents acting as complexing agents and their use in drying alkyd coating compositions and autoxidation of unsaturated polyesters.

It is an object of the invention to provide novel driers for drying alkyd coating compositions.

Another object is to provide novel curing agents or accelerator for cross-linkable unsaturated polyesters.

It has now been found that these objects can be attained by the use of complexes of the general formula

[Co(II)(Z)$_n$]X$_2$ wherein X is halogen, Z is a non sulfur bearing, non nitro unidentate ligand in which the metal complex is soluble and $n$ varies from 1 to 6 as driers for drying alkyd resin compositions and a curing agents or accelerators for cross-linkable unsaturated polyesters. Representative structures of Z in the formula are aliphatic, cycloaliphatic and aromatic alcohols, ketones, isocyanides, amides, aldehydes, ethers, esters, nitriles, oximes, amines, phosphines and phosphine oxides.

When in solution, cobalt halides form with the solvent that are known as planar, tetrahedral or octahedral Werner complexes. Since cobalt in its +2 oxidation state is essentially either tetra or hexa coordinate a maximum of 6 unidentate ligand can be expected to be bonded to each atom of cobalt. This is mostly the case when the ligand is of small size, e.g., methyl alcohol. Thus the configuration of [Co(II)(CH$_3$OH)$_6$]Br$_2$ in FIG. 1.

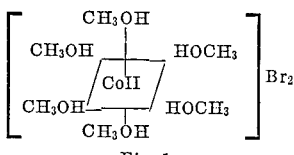

Fig. 1

On the other hand larger molecules sometimes present sufficient steric hindrance as to allow only four ligands or even less to coordinate with the metal, e.g. triphenyl phosphine oxide leading to the complex

[Co(II)(C$_6$H$_5$)$_3$PO]Cl$_2$

These non chelate complexes were found to be very potent catalysts or promoters for the polymerization of unsaturated polyester systems and drying alkyd resins.

The following unidentate ligands were specifically used in the process of reducing this invention to practice but their enumeration should not be construed as limiting the scope of the invention; methyl alcohol, benzyl alcohol, isopropyl ether, acetone, cyclohexanone, acetaldehyde, benzaldehyde, methyl acetate, acetonitrile, benzonitrile, aniline, hydroxylamine, triphenyl phosphine oxide.

Additional unidentate ligands are ethyl alcohol, propyl alcohol, isopropyl alcohol, butyl alcohol, sec. butyl alcohol, hexyl alcohol, isooctyl alcohol, 2-ethylhexanol, n-octyl alcohol, decyl alcohol, isodecyl alcohol, dodecyl alcohol, methyl ethyl ketone, methyl amyl ketone, isophorone, diethyl ketone, di-n-propyl ketone, diisopropyl ketone, di-n-butyl ketone, diisobutyl ketone, di sec. butyl ketone, di-n-amyl ketone, methyl-n-propyl ketone, pinacolone, 6-methyl-2-heptanone, methyl n-octyl ketone, ethyl n-butyl ketone, cyclobutanone, cyclopentanine, 2-methyl cyclohexanone, cycloheptanone, fenchone, acetophenone, benzophenone (molten), hexanone 3, furfural, tetrahydrofurfural, propionaldehyde, butyraldehyde, isobutyraldehyde, valeraldehyde, heptaldehyde, o-chlorobenzaldehyde, p - tolualdehyde, phenyl acetaldehyde, n - ethyl aniline, N-methyl aniline, isopropylamine, butyl amine, decyl amine, diethyl amine, dipropyl amine, diisobutylamine, diamyl amine, methyl ethyl amine, cyclohexyl amine, dicyclohexyl amine, o-toluidine, p-toluidine, m-toluidine, propyl acetate, ethyl acetate, amyl acetate, benzyl acetate, phenyl acetate, cyclohexyl acetate, butyl acetate, ethyl propionate, methyl butyrate, amyl valerate, heptyl laurate, ethyl palmitate, diethyl ether, dipropyl ether, methyl n-butyl ether, ethyl n-butyl ether, dibutyl ether, diamyl ether, dihexyl ether, tetrahydrofurane, diphenyl ether, anisole, ethyl phenyl ether, benzyl methyl ether, benzyl ethyl ether, propionitrile, phenyl acetonitrile, butyronitrile, valeronitrile, capronitrile, decanenitrile, myristonitrile, cyclohexyl cyanide, o-tolunitrile, m-tolunitrile, tris (2-chloroethyl) phosphine oxide, chloroacetone, bis (2-chloroethyl) ether, secondary phenyl di (isooctyl) phosphine oxide [C$_6$H$_5$(i-C$_8$H$_{17}$)$_2$POH], pyridine, 2-methyl pyridine, 3-methyl pyridine, 4-methyl pyridine, 3-ethyl pyridine, 4-ethyl pyridine, 2,3-dimethyl pyridine, 2,6-dimethyl pyridine, 3,4-dimethyl pyridine, trimethyl amine, 2-chloroaniline, 3-chloroaniline, 4-chloroaniline, 2-bromoaniline, 3-bromoaniline, 4-bromoaniline, 2-iodoaniline, o-anisidine, p-anisidine, o-phenetidine, p-phenetidine, alpha naphthylamine, beta naphthyl amine, quinoline, isoquinoline, t-butyl alcohol, methyl isocyanide, phenyl isocyanide, p-tolylisocyanide, dimethylphenyl isocyanide, formaldehyde oxime, acetaldoxime, benzaldoxime, acetoneoxime, trimethyl phosphine, ethyl phosphine, diethyl phosphine, triethyl phosphine, tripropyl phosphine, dicyclohexyl phosphine, tricyclohexyl phosphine, diphenyl phosphine, triphenylphosphine, diethyl phenyl phosphine, ethyl diphenyl phosphine, trimethyl phosphine oxide, triethyl phosphine oxide, tricyclohexyl phosphine oxide, dimethyl formamide, dimethyl acetamide.

In making the complexes used in the present invention, all that is required is that the cobalt (II) halide, i.e., cobalt (II) fluoride, cobalt (II) chloride, cobalt (II) bromide or cobalt (II) iodide be dissolved in the unidentate ligand to form the non chelate complex. If a mixed solvent is used, e.g. methanol and aniline, then a mixed complex is found.

In the compounds, of course, cobalt always has a valence of 2. Thus with representative unidentate ligands there are formed in solution the following complexes cobalt fluoride methanol, cobalt chloride methanol, cobalt bromide methanol, cobalt iodide methanol, cobalt chloride benzyl alcohol, cobalt bromide benzyl alcohol, cobalt chloride isopropyl ether, cobalt bromide isopropyl ether, cobalt iodide isopropyl ether, cobalt fluoride isopropyl ether, cobalt fluoride acetone, cobalt chloride acetone, cobalt bromide acetone, cobalt iodide acetone, cobalt fluoride cyclohexanone, cobalt chloride cyclohexanone, cobalt bromide cyclohexane, cobalt iodide cyclohexanone, cobalt chloride, acetaldehyde, cobalt bromide acetaldehyde, cobalt iodide acetaldehyde, cobalt fluoride benzaldehyde, cobalt chloride benzaldehyde, cobalt bromide benzaldehyde, cobalt fluoride methyl acetate, cobalt chloride methyl acetate, cobalt bromide methyl acetate, cobalt iodide methyl acetate, cobalt chloride acetonitrile, cobalt bromide acetonitrile, cobalt iodide acetonitrile, cobalt chloride benzonitrile, cobalt bromide benzonitrile, cobalt fluoride aniline, cobalt chloride aniline, cobalt bromide aniline, cobalt iodide aniline, cobalt chloride hydroxyl amine, cobalt bromide hydroxyl amine, cobalt chloride triphenyl phosphine oxide, cobalt bromide triphenyl phosphine oxide, cobalt iodide triphenyl phosphine oxide, cobalt chloride ethyl alcohol, cobalt bromide ethyl alcohol, cobalt chloride sec. butyl alcohol, cobalt bromide t-butyl alcohol, cobalt chloride isooctyl alcohol, cobalt iodide 2-ethylhexyl alcohol, cobalt chloride decyl alcohol, cobalt bromide dodecyl alcohol, cobalt chloride methyl ethyl ketone, cobalt bromide methyl amyl ketone, cobalt chloride isophorone, cobalt bromide dibutyl ketone, cobalt chloride cyclobutanone, cobalt chloride cyclopentanone, cobalt bromide fenchone, cobalt chloride acetophenone, cobalt bromide benzophenone, cobalt chloride furfural, cobalt bromide, tetrahydrofurfural, cobalt chloride propionaldehyde, cobalt bromide isobutyraldehyde, cobalt chloride heptaldehyde, cobalt chloride o-chlorobenzaldehyde, cobalt bromide, p-tolualdehyde, cobalt chloride phenylacetaldehyde, cobalt bromide N-ethyl aniline, cobalt chloride N-methyl aniline, cobalt bromide propyl amine, cobalt chloride isopropyl amine, cobalt chloride decyl amine, cobalt bromide diethyl amine, cobalt chloride diamyl amine, cobalt bromide methyl ethyl amine, cobalt chloride cyclohexyl amine, cobalt bromide dicyclohexyl amine, cobalt chloride o-toluidine, cobalt bromide m-toluidine, cobalt chloride propyl acetate, cobalt bromide ethyl acetate, cobalt chloride amyl acetate, cobalt bromide benzyl acetate, cobalt chloride phenyl acetate, cobalt bromide ethyl propionate, cobalt chloride amyl valerate, cobalt bromide ethyl palmitate, cobalt chloride heptyl laurate, cobalt chloride diethyl ether, cobalt bromide dipropyl ether, cobalt chloride methyl n-butyl ether, cobalt bromide dibutyl ether, cobalt chloride dihexyl ether, cobalt bromide tetrahydrofurane, cobalt chloride diphenyl ether, cobalt bromide anisole, cobalt chloride ethyl phenyl ether, cobalt bromide benzyl methyl ether, cobalt chloride propionitrile, cobalt bromide phenyl acetonitrile, cobalt chloride valeronitrile, cobalt bromide myristonitrile, cobalt chloride cyclohexyl cyanide, cobalt bromide chloroacetone, cobalt chloride bis (2-chloroethyl) ether, cobalt bromide sec. phenyl di (isooctyl) phosphine oxide, cobalt chloride sec. phenyl (di(isooctyl) phosphine oxide, cobalt bromide 2-methyl pyridine, cobalt chloride 4-methyl pyridine, cobalt bromide pyridine, cobalt chloride 3-ethyl pyridine, cobalt bromide 2,6-dimethyl pyridine, cobalt chloride trimethyl amine, cobalt bromide 2-chloroaniline, cobalt chloride 3-bromoaniline, cobalt bromide 2-iodoaniline, cobalt chloride o-anisidine, cobalt bromide p-phenetidine, cobalt chloride alpha naphthyl amine, cobalt bromide beta naphthyl amine, cobalt chloride quinoline, cobalt bromide isoquinoline, cobalt chloride methyl isocyanide, cobalt bromide phenyl isocyanide, cobalt chloride p-tolylisocyanide, cobalt bromide dimethylphenyl isocyanide, cobalt chloride formaldehyde oxime, cobalt bromide acetaldoxime, cobalt chloride benzaldoxime, cobalt bromide acetoneoxime, cobalt chloride trimethyl phosphine, cobalt bromide ethyl phosphine, cobalt chloride diethyl phosphine, cobalt bromide triethyl phosphine, cobalt chloride tripropyl phosphine, cobalt bromide dicyclohexyl phosphine, cobalt chloride trcyclohexyl phosphine, cobalt bromide triphenyl phosphine, cobalt chloride diphenyl phosphine, cobalt bromide diethyl phenyl phosphine, cobalt chloride ethyl diphenyl phosphine, cobalt bromide trimethyl phosphine oxide, cobalt chloride triethyl phosphine oxide, cobalt bromide tricyclohexyl phosphine oxide, cobalt chloride dimethyl formamide, cobalt bromide dimethyl acetamide, cobalt chloride allyl amine, cobalt chloride tris (2-chloroethyl) phosphine oxide.

As stated, such cobalt halide unidentate ligands are old. Many of them, for example, are found in Gmelins Handbuck der anorganischen Chemie, 8th edition, the volume on Cobalt.

Among the many isolated solid cobalt halide complexes which can be used in the invention mention is made of cobalt chloride 1 triethylamine, cobalt bromide 1 triethyl amine, cobalt iodide 1-triethyl amine, cobalt chloride 2 ethyl amine, cobalt bromide 2 ethyl amine, cobalt iodide 2 ethyl amine, cobalt chloride 3 alkyl amine, cobalt chloride 4 pyridine, cobalt chloride 3 methanol, cobalt bromide 3 methanol, cobalt iodide 3 methanol, cobalt chloride 4 methanol, cobalt bromide 4 methanol, cobalt iodide 4 methanol, cobalt chloride 6 methanol, cobalt bromide 6 methanol, cobalt chloride 4 methyl isocyanide, cobalt chloride 2-triphenyl phosphine oxide.

The polymerization of unsaturated polyesters by a cross-linking process is known to occur by free radical initiation and this is usually achieved by using organic peroxides as polymerization catalysts. While the rate of decomposition of such peroxides into free radicals is influenced by the type of peroxide and the temperature used, it is also directly influenced by the addition of accelerators or inhibitors. Accelerators promote the decomposition of peroxides into free radicals at temperatures below those required to release free radicals if the peroxide is used alone.

When treated with catalyst-accelerator combinations, standard unsaturated polyester resins show various gelation and cure characteristics which depend on the nature of the said combination. During polymerization, resins pass through a critical point at which the viscosity increases suddenly (gel point) then harden slowly while undergoing an exothermic polymerization reaction. Both the gel time and the cure exothermic heat have significant influence on the physical properties of the finished product as well as the practical workability of the resin in various applications.

In the present state of the art, cobaltous carboxylates, such as cobalt naphthenate, are among the most active accelerators available, but their limitations are still numerous and the gel time of a standard polyester resin catalyzed with methyl-ethyl ketone peroxide can merely be shortened by only 50%, with the accelerator. The cure time, expressed in minutes necessary to reach the polymerization's peak exotherm, takes well over the half hour and the performance cannot be improved by merely increasing the metal content of the polymer.

It has been found that the cobaltous halide complexes described above showed catalytic activity far better than that of cobaltous carboxylates.

When used with acyl peroxides as primary catalyst these cobalt accelerators allowed us to observe polyester gel times of a few minutes. A further advantageous feature of these accelerators is their versatility as gel-cure modifiers. The variation of the peroxide-accelerator ratio allows a multiple choice in gel times and cure rates of polyester systems following the processor's requirements. The effectiveness of the cobalt halide accelerators could be observed at usage levels as low as 0.0001%, usually at least 0.001% by weight of the resin and the accelerators can be used at levels as high as 5% or even 10% (in solution or otherwise), levels at which they cause extremely high polymerizations. At higher levels the discoloration of the resin by the catalyst system becomes prohibitive. Another area of application where cobalt II halide complexes constitute a significant improvement over existing art is the drying of paint films. They are particularly useful as primary drying catalysts for long oil alkyd paint which usually require long drying times and relatively high metal concentrations. It is well known that various soaps of cobalt constitute the preferred paint driers as they are most susceptible to promote the autoxidation process by free radical induction at the sites of unsaturation in the paint film. The superior performance observed earlier was confirmed when ketone solutions of the cobalt halide unidentate complexes were used as drying catalysts at similar levels of usage, varying from 0.0001%, usually 0.001% to 5% or more, e.g. 10%.

The drying accelerators of the present invention can be employed with any of the conventional drying alkyd resins and unsaturated polyesters.

The curing alkyd resins can be made from acids (or the anhydrides if available) such as phthalic anhydride, isophthalic acid, trimellitic acid, pyromellitic acid, trimesic acid, maleic anhydride, fumaric acid, azelaic acid, succinic acid, adipic acid, tetrahydrophthalic anhydride, tetrachlorophthalic anhydride, dimerized fatty acids and sebacic acid reacted with polyhydric alcohols such as glycerol, pentaerythritol, dipentaerythritol, trimethylolethane, sorbitol, trimethylolpropane, ethylene glycol, propylene glycol, neopentylene glycol and dipropylene glycol together with drying oils such as soyabean oil, linseed oil, tung oil, dehydrated castor oil, fish oil, corn oil, perilla oil, safflower oil, oiticica oil and cottonseed oil, as well as the acids of such drying oils and tall oil acids.

Unless otherwise indicated, all parts and percentages are by weight.

Typical suitable unsaturated oil or fatty acid modified alkyd resins are set forth below. They can have oil lengths of 30 to 70 or even higher.

| | Alkyd A, parts |
|---|---|
| Tall oil fatty acids | 127.0 |
| Pentaerythritol | 73.3 |
| Ethylene glycol | 34.9 |
| Phthalic anhydride | 145.0 |
| Maleic anhydride | 3.0 |
| Acid Number | 12 |

| | Alkyd B, parts |
|---|---|
| Soyabean oil | 130.0 |
| 98% glycerol | 90.0 |
| Phthalic anhydride | 145.0 |
| Maleic anhydride | 3.0 |
| Acid Number | 8 |

| | Alkyd C, parts | Alkyd D, parts |
|---|---|---|
| Soyabean oil | 25.0 | |
| Litharge | 0.06 | |
| Pentaerythritol | 60.0 | 110.0 |
| Phthalic anhydride | 148.0 | 148.0 |
| Tall oil fatty acids | | 260.0 |
| Ethylene glycol | | 12.8 |
| Acid Number | 10 | 10 |

| | Alkyd E, parts | Alkyd F, parts |
|---|---|---|
| Soyabean oil | 132.0 | 175.0 |
| Linseed oil | 132.0 | |
| Dehydrated castor oil | | 50.0 |
| Litharge | 0.09 | 0.05 |
| Pentaerythritol | 91.0 | |
| Glycerol | | 83.0 |
| Phthalic anhydride | 148.0 | 145.0 |
| Maleic anhydride | | 3.0 |
| Acid number | 12 | 8 |

| | Alkyd G, parts | Alkyd H, parts |
|---|---|---|
| Tall oil fatty acids | 322.0 | 230.0 |
| Safflower oil | | 156.0 |
| Litharge | | 0.04 |
| Pentaerythritol | 126.0 | 109.0 |
| Phthalic anhydride | 148.0 | 148.0 |
| Acid number | 10 | 8 |

| | Alkyd I, parts | Alkyd J, parts |
|---|---|---|
| Soyabean oil | 366.0 | |
| Menhaden oil | | 400.0 |
| Litharge | 0.08 | 0.10 |
| Pentaerythritol | 81.0 | 75.0 |
| 98% glycerol | | 23.0 |
| Phthalic anhydride | 145.0 | |
| Isophthalic acid | | 166.0 |
| Maleic anhydride | 3.0 | |
| Acid number | 10 | 12 |

| | Alkyd K, parts | Alkyd L, parts |
|---|---|---|
| Tall oil fatty acids | 719.0 | 1,740.0 |
| Pentaerythritol | 713.0 | 284.0 |
| Isophthalic acid | 166.0 | 166.0 |
| Acid number | 10 | 12 |

| | Alkyd M, parts | Alkyd N, parts |
|---|---|---|
| Linseed oil | 700.0 | |
| Safflower oil | | 1,180.0 |
| Litharge | 0.07 | 0.08 |
| Pentaerythritol | 71.0 | 80.0 |
| Phthalic anhydride | 148.0 | |
| Isophthalic acid | | 166.0 |
| Acid number | 10 | 8 |

Typical examples of unsaturated polyesters, polyester resins are set forth below. In polyesters A through I, the acid and alcohol components prereacted to the indicated acid number were dissolved in styrene to give 70% total nonvolatiles, i.e. the styrene was 30% of the composition. The final compositions also contained 0.015% to t-butyl catechol.

| | Polyester A, parts | Polyester B, parts |
|---|---|---|
| 1,2-propylene glycol | 1,700 | 1,700 |
| Maleic anhydride | 1,528 | 1,528 |
| Phthalic anhydride | 770 | 770 |
| Hydroquinone | 0.40 | 0.40 |
| Acid number | 72 | 31.4 |
| Styrene | (1) | (1) |

[1] 30% of composition.

| | Polyester C, parts | Polyester D, parts |
|---|---|---|
| 1,2-propylene glycol | 1,700 | 1,700 |
| Fumaric acid | 1,810 | 603 |
| Phthalic acid | 770 | 2,309 |
| Hydroquinone | 0.42 | 0.46 |
| Acid number | 37.1 | 26.6 |
| Styrene | (1) | (1) |

[1] 30% of composition.

| | Polyester E, parts |
|---|---|
| 1,2-propylene glycol | 1,700 |
| Fumaric acid | 1,800 |
| Isophthalic acid | 864 |
| Hydroquinone | 0.45 |
| Acid Number | 30.3 |

Styrene, 30% of composition.

| | Polyester F, parts | Polyester G, parts |
|---|---|---|
| 1,2-propylene glycol | 1,700 | 1,370 |
| Fumaric acid | 1,447 | 1,170 |
| Adipic acid | 1,095 | |
| HET acid | | 2,355 |
| Phthalic anhydride | 126 | 110 |
| Hydroquinone | 0.44 | 0.5 |
| Acid number | 11.7 | 46.7 |
| Styrene | (1) | (1) |

[1] 30% of composition.

| | Polyester H, parts | Polyester I, parts |
|---|---|---|
| Diethylene glycol | 233.4 | 292.0 |
| Ethylene glycol | | 170.0 |
| Maleic anhydride | 196.1 | 343.0 |
| Phthalic anhydride | | 111.0 |
| Adipic acid | | 109.0 |
| p-t-Butyl catechol | 0.02 | 9.02 |
| Acid number | 45 | 25 |
| Styrene | (1) | (1) |

[1] As is conventional in the art, the styrene can be 20 to 50% of the total composition. In place of styrene, there can be used other ethylenically unsaturated compounds such as diallyl phthalate, triallyl isocyanurate, acrylamide- N-t-butylacrylamide, triallyl cyanurate, p-vinyl toluene, acrylonitrile, alpha methyl styrene, divinyl benzene, N-vinyl pyrrolidone, methyl acrylate, methyl methacrylate, allyl diglycol carbonate, trimethylolpropane diallyl ether, trimethylolpropane monoallyl ether, allyl ethers of sorbitol, pentaerythritol, sucrose and glucose. Any of the polybasic acids and polyhydric alcohols employed in making alkyd resins can be incorporated as components in making the unsaturated polyester resins.

Water thinnable unsaturated polyester formulations can be used, e.g. those in Ghosh Patent 3,463,750 (the entire disclosure of Ghosh is incorporated by reference). A typical formula is that shown in Ghosh Example 1 made from 108 parts trimellitic anhydride, 118 parts phthalic anhydride, 108 parts trimethylolpropane and 269 trimethylolpropane-diallyl ether having an acid number of 50–52 and dissolved in 30 parts isopropanol, 60 parts of 28% aqueous ammonia, 390 parts of water and 90 parts t-butyl alcohol. This solution at 45% solids is hereinafter called Polyester Formulation J.

The standard procedure for evaluating films was the determination of time until the film was dust free and thorough hard. These times were determined in the following manner. Within 24 to 48 hours after preparation of the formulation, a film was applied on a polished plate glass panel by means of a 0.006 inch "Bird" applicator delivering a wet film thickness of 0.003 inch. The film was allowed to dry in an environmental room at constant temperature and humidity, illuminated by artificial light and allowing 95% reproducibility. The drying times of the film were determined by the improved Gardner circular drying time recorder over a period of 24 hours. The recorder basically consists of a synchronous motor with its shaft oriented in the true vertical. A pivotable arm assembly is attached to this shaft and operates a counterpoised vertical stylus consisting of a thermosetting Teflon sphere which does not stick to the drying film. When the stylus, set in motion by the motor, no longer leaves a clear channel but begins to rupture the dry upper layer of the film, the surface may be considered to be "dust free". When the stylus no longer ruptures the film but moves freely on its surface, the film may be considered "thorough hard".

In the following examples the use of "n" with the complex indicates that the complex was in solution in the unidentate ligand.

EXAMPLE 1

The polymerization of 50 g. of LAMINAC 4152 (a styrene modified rigid polyester resin of low reactivity and of medium molecular weight, viscosity 4–5 poises at 77° C., manufactured by the American Cyanamid Co.), was initiated by the addition of 0.5 g. of methyl ethyl ketone peroxide and various amounts of a methanolic solution of cobalt (II) bromide (6% Co). The gel time for each sample was determined at 22° C. on a comparative viscosimeter which measures the time required to reach the point of gelation or primary crosslinking. The cure time and peak exotherm were determined on a WEST single per recording potentiometer. One sample was accelerated with 0.5 g. of cobaltous naphthenate (6% Co) and used as a control. The experimental results are summarized in Table 1.

TABLE 1

| Amount of $Co(II)(CH_3OH)_6Br_2$ per 50 g. of resin, g. | Gel time at 22° C., min. | Cure time, min. | Peak exotherm, °C. |
|---|---|---|---|
| 0.5 | 6 | 14 | 145 |
| 0.4 | 7 | 18 | 142 |
| 0.3 | 8 | 21 | 142 |
| 0.2 | 9 | 32 | 135 |
| 0.1 | 10 | 42 | 75 |
| 0.5 [1] | 19 | 63 | 110 |

[1] Co naphthenate 6%.

In place of the LAMINAC 4152 in Example 1, the use of Polyester A gives similar results.

EXAMPLE 2

The experiment of Example 1 was repeated while keeping the level of cobalt (II) bromide methanol complex at a constant level of 0.5 g. per 50 g. of resin and varying the amount of methyl ethyl ketone peroxide in the system. For comparison, a resin system was initiated with 0.5 g. of cobaltous naphthenate complex and 0.25 g. of peroxide. As can be seen from the results summarized in Table 2, the system catalyzed by the peroxide-cobaltous naphthenate combination fails to cure when low levels of peroxide are used as primary catalyst.

TABLE 2

| Amount of MEK peroxide per 50 g. of resin | Gel time at 22° C., min. | Cure time, min. | Peak exotherm, °C. |
|---|---|---|---|
| 1.0 | 5 | 13 | 155 |
| 0.5 | 5 | 15 | 140 |
| 0.25 | 10 | 22 | 110 |
| 0.25 [1] | 35 | No cure | |

[1] Used with 0.5 g. of 6% Co naphthenate.

Similar results are obtained when Polyester A is substituted for the LAMINAC resin.

EXAMPLE 3

50 g. of the general purpose LAMINAC 4152 resin of the preceding examples was polymerized at room temperature (22° C.) by using 0.5 g. of methyl ethyl ketone peroxide and 0.5 g. of a 4.5% metal solution of the cobalt (II) halide complexes of Table 3 in their own ligands. As can be seen the gel and cure times recorded compare favorably with a system initiated with 0.5 g. of cobalt (II) 2-ethyl hexoate (4.5% metal).

TABLE 3

| Accelerators | Gel time at 22° C., min. | Cure time, min. |
|---|---|---|
| $[Co(II)[(ClC_2H_4)_3POH]_n]Cl_2$ | 13 | 42 |
| $[Co(II)[C_6H_5(i-C_8H_{17})_2POH]_n]Br_2$ | 11 | 40 |
| $[Co(II)(C_6H_5-NH_2)_n]Cl_2$ | 1 | 14 |
| $[Co(II)[HCON(CH_3)_2]_n]Br_2$ | 9 | 40 |
| $[Co(II)(C_5H_5N)_n]Cl_2$ (piperidine complex) | 6 | 25 |
| $[Co(II)(C_6H_5-CHO)_n]I_2$ | 16 | 50 |
| $Co(OCO-CH(CH_2)-CH_2)_2$ <br> $\quad\quad\quad\quad\;\;\;\;\;\;\;\;\;\;\;\;\;\;\;\;\;\;\;\;\,\mid$ <br> $\quad\quad\quad\quad\quad\quad\quad\quad\;\;\;\;\;\;\;\;\;\;\;\;\;\;\,C_3H_5$ | 19 | 63 |

Similar results are obtained when Polyester A is substituted for the LAMINAC resin.

EXAMPLE 4

50 g. of CX 586, a high molecular weight low reactivity styrene modified polyester resin manufactured by the Chevron Chemical Co. was catalyzed at 22° C. with 0.5 g. of benzoyl peroxide and 0.5 g. of the dimethyl acetamide complex of cobalt (II) bromide (6% metal). The gel time of 25 minutes and cure time of 27 hours compared favorably with a similar system accelerated with 0.5 g. of cobaltous naphthenate (6% metal) which did neither cure nor gel after several days.

EXAMPLE 5

A typical long oil alkyd test formulation consisted of (a) a grind containing 1265 g. of titanium dioxide, 1000 g. of 505–70 alkyd resin, a pure soya based long oil alkyd resin having about 63% soya oil and 23% phthalic anhydride Acid No. 10 maximum, manufactured by the McCloskey Varnish Co., 115 g. of "Rule 66" Mineral Spirit and (b) a let down containing 1145 g. of the same 505–70 alkyd vehicle and 500 g. of the same "Rule 66" solvent. To 50 g. of the above composition was added 0.05 g. of methyl ethyl ketoxine as an antiskinning agent, and 0.4 g. of a methanolic solution of cobalt chloride hexa methyl alcohol complex. (The solution was standardized at a 6% cobalt content). The system was evaluated under the standard procedure set forth above at a room temperature of 32° C. and 30% humidity and compared to two similar systems, one containing 0.4 g. of Cobalt octoate (6% Co) as drier, the other containing no drier. The results are summarized in Table 4.

TABLE 4

| Drying catalyst | Dust free, hours | Thru hardness, hours |
|---|---|---|
| $[Co(II)(CH_3OH)_n]Cl_2$ | 3 | 19.5 |
| $Co(OCO-CH-(CH_2)_3-CH_3)_2$ <br> $\quad\quad\quad\quad\quad\;\;\;\;\;\;\;\;\;\;\;\;\;\;\,\mid$ <br> $\quad\quad\quad\quad\quad\quad\quad\quad\;\;\;\;\;\;\;\;\;\;\;\;\;\,C_2H_5$ | 4 | 22 |
| No catalyst | Wet | Wet |

In place of the 505-70 alkyd resin in Example 5, the same amount of Alkyd I gives similar results.

EXAMPLE 6

The drying of 50 g. of the basic formulation of Example 5 but containing no titanium dioxide and no antiskinning agent was catalyzed by the addition of 0.4 g. of a solution of cobalt (II) bromide in aniline (6% metal). The system was compared to an uncatalyzed system and one containing 0.4 g. of cobalt naphthenate (6% metal). The experimental results are reported in Table 5.

TABLE 5

| Drying | Dust free, hours | Thru hardness, hours |
|---|---|---|
| [Co(II)(C$_6$H$_5$—NH$_2$)$_n$Br$_2$] | 0.5 | 12 |
| Co naphthenate 6% | 3.5 | 22 |
| No catalyst | Wet | Wet |

In place of the 505-70 alkyd resin in Example 6, there can be used the same amount of Alkyd H with similar results.

What is claimed is:

1. A composition comprising a polymer selected from the group consisting of (A) drying alkyd resins and (B) cross-linkable unsaturated polyesters and as a curing agent or accelerator thereof a cobalt II halide complex of the formula [Co(II)(Z)$_n$]X$_2$ where X is a halogen, Z is a non sulfur bearing, non nitro, unidentate organic ligand or hydroxylamine in which the cobalt complex is soluble and $n$ is an integer from 1 to 6, the complex being present in an amount of 0.0001% to 10%.

2. A composition according to claim 1 wherein X is Cl, Br or I.

3. A composition according to claim 1 wherein Z is an alcohol, amine, ether, aldehyde, ketone, ester, nitrile, phosphine, phosphine oxide, isocyanide, oxime or hydroxylamine.

4. A composition according to claim 3 wherein Z is free of any additional substituents other than halogen.

5. A composition according to claim 4 wherein the polymer is (A).

6. A composition according to claim 5 wherein Z is a lower alkanol.

7. A composition according to claim 5 wherein Z is an amine.

8. A composition according to claim 4 wherein the polymer is (B) and there is also present an organic peroxide as a curing agent.

9. A composition according to claim 8 wherein Z is a lower alkanol.

10. A composition according to claim 8 wherein Z is an amine.

References Cited

UNITED STATES PATENTS

| | | | |
|---|---|---|---|
| 2,719,132 | 9/1955 | Schweitzer | 260—17 |
| 3,068,180 | 12/1962 | van Amerongen | 252—429 |
| 3,207,741 | 9/1965 | Schafer et al. | 260—94.3 |
| 3,297,788 | 1/1967 | Dun et al. | 260—863 |
| 3,398,213 | 8/1968 | Chetakian | 260—863 |
| 3,463,750 | 8/1969 | Ghosh | 260—22 |
| 3,467,610 | 9/1969 | Fiarman et al. | 260—22 |

DONALD E. CZAJA, Primary Examiner

R. W. GRIFFIN, Assistant Examiner

U.S. Cl. X.R.

23—356; 117—124 E, 161 K; 260—23 P, 75 UA, 863